(12) United States Patent
Gibbs et al.

(10) Patent No.: US 10,664,741 B2
(45) Date of Patent: May 26, 2020

(54) SELECTING A BEHAVIOR OF A VIRTUAL AGENT

(71) Applicant: Samsung Electronics Co., Ltd., Suwon-si, Gyeonggi-do (KR)

(72) Inventors: Simon J. Gibbs, San Jose, CA (US); Anthony Liot, Cupertino, CA (US); Yu Song, Pleasanton, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 303 days.

(21) Appl. No.: 14/996,030

(22) Filed: Jan. 14, 2016

(65) Prior Publication Data

US 2017/0206095 A1    Jul. 20, 2017

(51) Int. Cl.
| | |
|---|---|
| *G06N 3/00* | (2006.01) |
| *G06T 13/40* | (2011.01) |
| *G06F 9/451* | (2018.01) |
| *G06F 3/16* | (2006.01) |

(52) U.S. Cl.
CPC ............ *G06N 3/006* (2013.01); *G06F 3/167* (2013.01); *G06F 9/453* (2018.02); *G06T 13/40* (2013.01); *G06F 2203/011* (2013.01)

(58) Field of Classification Search
CPC ........ G06F 9/4446; G06F 3/167; G06F 9/453; G06F 2203/011; G06T 13/40; G06N 3/006
See application file for complete search history.

(56) References Cited

U.S. PATENT DOCUMENTS

| | | | |
|---|---|---|---|
| 6,031,549 A | * | 2/2000 | Hayes-Roth ............ G06T 13/40 345/474 |
| 6,212,502 B1 | | 4/2001 | Ball et al. |
| 7,113,848 B2 | | 9/2006 | Hanson |
| 8,284,157 B2 | | 10/2012 | Markovic et al. |
| 8,390,680 B2 | | 3/2013 | Perez et al. |
| 8,909,370 B2 | | 12/2014 | Stiehl et al. |
| 8,941,666 B1 | * | 1/2015 | Kovar ..................... G06T 13/40 345/427 |
| 9,082,400 B2 | | 7/2015 | Rezvani et al. |
| 9,304,652 B1 | * | 4/2016 | Lundin ............... G06F 3/04815 |

(Continued)

FOREIGN PATENT DOCUMENTS

KR    10-1153316    12/2011

OTHER PUBLICATIONS

International Search Report dated Dec. 20, 2016 from International Application No. PCT/KR2016/010086.

(Continued)

*Primary Examiner* — Kieu D Vu
*Assistant Examiner* — Roberto Borja

(57) ABSTRACT

In one aspect, a method for operating a virtual agent will be described. An interaction context is obtained. An agent state is determined based on the obtained interaction context. The agent state indicates an activity of the virtual agent. The emotion of the virtual agent is updated based on the obtained interaction context, the determined agent state and/or a personality of the virtual agent. One or more behaviors are selected. Each behavior involves or indicates a change in an appearance of the virtual agent or generation of audio. Various embodiments relate to devices, servers, software and systems arranged to implement one or more of the above operations.

19 Claims, 8 Drawing Sheets

| Tag Type | Examples |
|---|---|
| Activity | searching, listening, watching, thinking, speaking, sleeping, greeting, falling asleep, waking up, nodding, staring, smiling, flaring, emoting |
| Environment | slow system, interrupting user, many faces |
| Emotion | anger, disgust, fear, joy, sadness, surprise, admiration, vigilance, happy, amused, concerned, annoyed, confused |
| Mood | agree, considering, questioning, disagree, attentive, curious, distracted, bored, calm, nervous |
| Personality | neurotic, extraverted, open, agreeable, conscientious, stable, introverted, closed, disagreeable, sponaneous, funny, serious, helpful, unhelpful |

(56) References Cited

U.S. PATENT DOCUMENTS

| | | | |
|---|---|---|---|
| 2004/0075677 A1* | 4/2004 | Loyall | G06F 3/011 |
| | | | 715/706 |
| 2005/0021372 A1* | 1/2005 | Mikkelsen | A61B 5/00 |
| | | | 705/2 |
| 2006/0248461 A1 | 11/2006 | Yamada et al. | |
| 2007/0238520 A1* | 10/2007 | Kacmarcik | A63F 13/10 |
| | | | 463/33 |
| 2008/0096533 A1 | 4/2008 | Manfredi et al. | |
| 2008/0269958 A1 | 10/2008 | Filev et al. | |
| 2009/0128567 A1* | 5/2009 | Shuster | G06T 13/40 |
| | | | 345/473 |
| 2009/0147008 A1* | 6/2009 | Do | A63F 13/12 |
| | | | 345/473 |
| 2010/0153868 A1* | 6/2010 | Allen | G06T 13/40 |
| | | | 715/764 |
| 2011/0007079 A1 | 1/2011 | Perez et al. | |
| 2011/0148916 A1 | 6/2011 | Blattner | |
| 2012/0188233 A1* | 7/2012 | Shuster | G06T 15/20 |
| | | | 345/419 |
| 2013/0031476 A1 | 1/2013 | Coin | |
| 2013/0038601 A1* | 2/2013 | Han | G06T 13/40 |
| | | | 345/419 |
| 2013/0187929 A1 | 7/2013 | Perez et al. | |
| 2013/0257876 A1 | 10/2013 | Davis | |
| 2014/0277735 A1 | 9/2014 | Breazeal | |
| 2014/0359439 A1* | 12/2014 | Lyren | G06F 3/011 |
| | | | 715/705 |
| 2015/0229978 A1 | 8/2015 | Brown et al. | |
| 2016/0189220 A1* | 6/2016 | Verma | G06Q 30/0256 |
| | | | 705/14.54 |

OTHER PUBLICATIONS

Written Opinion dated Dec. 20, 2016 from International Application No. PCT/KR2016/010086.

Supplementary European Search Report dated Dec. 12, 2018 in connection with European Patent Application No. 16 88 5211, 9 pages.

\* cited by examiner

300

| Behavior type | Description | Example |
|---|---|---|
| Facial Gesture | Movement involving upper and lower facial muscles | Smiling |
| Upper Facial Gesture | Movement involving upper facial muscles | Blinking |
| Lower Facial Gesture | Movement involving lower facial muscles | Chewing |
| Head Gesture | Rotation of head | Nodding |
| Facial Pose | Holding a facial pose involving the upper and lower face | Surprise |
| Upper Facial Pose | Holding a facial pose involving the upper face | Brow raised |
| Lower Facial Pose | Holding a facial pose involving the lower face | Lips pursed |
| Vocal Response | Verbal vocalization | Speaking |
| Vocal Gesture | Non-verbal vocalization | Yawning |
| Eye Gesture | Rotation of the eyeballs | Staring |

*FIG. 5*

| Tag Type | Examples |
|---|---|
| Activity | searching, listening, watching, thinking, speaking, sleeping, greeting, falling asleep, waking up, nodding, staring, smiling, flaring, emoting |
| Environment | slow system, interrupting user, many faces |
| Emotion | anger, disgust, fear, joy, sadness, surprise, admiration, vigilance, happy, amused, concerned, annoyed, confused |
| Mood | agree, considering, questioning, disagree, attentive, curious, distracted, bored, calm, nervous |
| Personality | neurotic, extraverted, open, agreeable, conscientious, stable, introverted, closed, disagreeable, sponaneous, funny, serious, helpful, unhelpful |

FIG. 6

SELECTING A BEHAVIOR OF A VIRTUAL AGENT

TECHNICAL FIELD

An embodiment of the present invention relates generally to technologies for a virtual agent, and more particularly to a virtual agent that is represented by an animated form and/or has a simulated personality.

BACKGROUND

Various technology companies have made efforts to improve and simplify the interaction between electronic devices and people. Some electronic devices, for example, include virtual agents. In various applications, virtual agents simulate a person or entity that can communicate with a person using, for example, spoken words or a natural language interface. Some examples of virtual agents include Cortana®, which was created by the Microsoft Corporation, and Siri®, which was created by Apple Inc. Both virtual agents are software applications that can be executed on a device, such as a personal computer or a mobile phone. For example, a person can use a microphone on the device to ask a simple question about the weather or the score of a sports game. The applications can then reply using spoken words, provide hyperlinks or display information on a screen.

SUMMARY

In one aspect, a method for operating a virtual agent will be described. An interaction context is obtained. The interaction context may include a communication context, target information, situation information and/or people information. An agent state is determined based on the obtained interaction context. The agent state indicates an activity of the agent. The emotion of the virtual agent is updated based on the obtained interaction context, the determined agent state and/or a personality of the virtual agent. One or more behaviors are selected based on the obtained interaction context and/or the updated emotion of the virtual agent. Each behavior involves or indicates a change in an appearance of the virtual agent or generation of audio. Various embodiments relate to devices, servers, software and systems arranged to implement one or more of the above operations.

In another aspect, a computer readable storage medium is described. The computer readable storage medium includes executable computer code embodied in a tangible form. The executable computer code is operable to obtain an interaction context. The interaction context includes at least one of a communication context, target information, situation information and people information. The executable computer code is further operable to determine an agent state based on the obtained interaction context. The agent state indicates activity of the agent. The executable computer code is further operable to update emotion of the virtual agent based on the obtained interaction context, the determined agent state and a personality of the virtual agent. The executable computer code is further operable to select one or more behaviors based on the obtained interaction context and the updated emotion. Each behavior involves an adjustment of an appearance of the virtual agent or generation of audio.

In another aspect, a device will be described. The device includes at least one processor and memory circuitry including a computer readable storage medium that is arranged to store computer code in a tangible form. The computer code, when executed by the at least one processor, causes the device to obtain an interaction context. The interaction context includes at least one of a communication context, target information, situation information and people information. The computer code further causes the device to determine an agent state based on the obtained interaction context. The agent state indicates activity of the agent. The computer code further causes the device to update emotion of the virtual agent based on the obtained interaction context, the determined agent state and a personality of the virtual agent. The computer code further causes the device to select one or more behaviors based on the obtained interaction context and the updated emotion. Each behavior involves an adjustment of an appearance of the virtual agent or generation of audio.

BRIEF DESCRIPTION OF THE DRAWINGS

The invention and the advantages thereof, may best be understood by reference to the following description taken in conjunction with the accompanying drawings in which:

FIG. 5 is a table of behavior types and behaviors according to a particular embodiment of the present invention.

FIG. 6 is a table of behavior tag types and tags according to a particular embodiment of the present invention.

DETAILED DESCRIPTION

The present invention relates to technologies for operating a virtual agent. As noted in the Background, various personal assistants exist that can answer basic questions or provide information. However, such personal assistants have limitations. Some, for example, rely on limited contextual information in developing their responses e.g., their response may be entirely based on the question posed by the user. Unlike a human being, they typically do not take into account visual information or the overall context of the conversation.

Additionally, some personal assistants are visually unappealing. They may not have a physical form, or may be represented simply by a symbol or a flashing dot. For some applications, it would be desirable to have a virtual agent that actually takes on a relatable visual form e.g., a virtual agent model that makes expressions or gestures that are appropriate for the context at hand.

For some applications, it would also be desirable if personal assistants had a simulated personality and/or emotions. That is, it may make conversation with the personal assistant more interactive and engaging if the personal assistant seems to have an actual personality i.e., longstanding traits or tendencies that are not wholly dependent on the current context or conversation.

Figure 1:
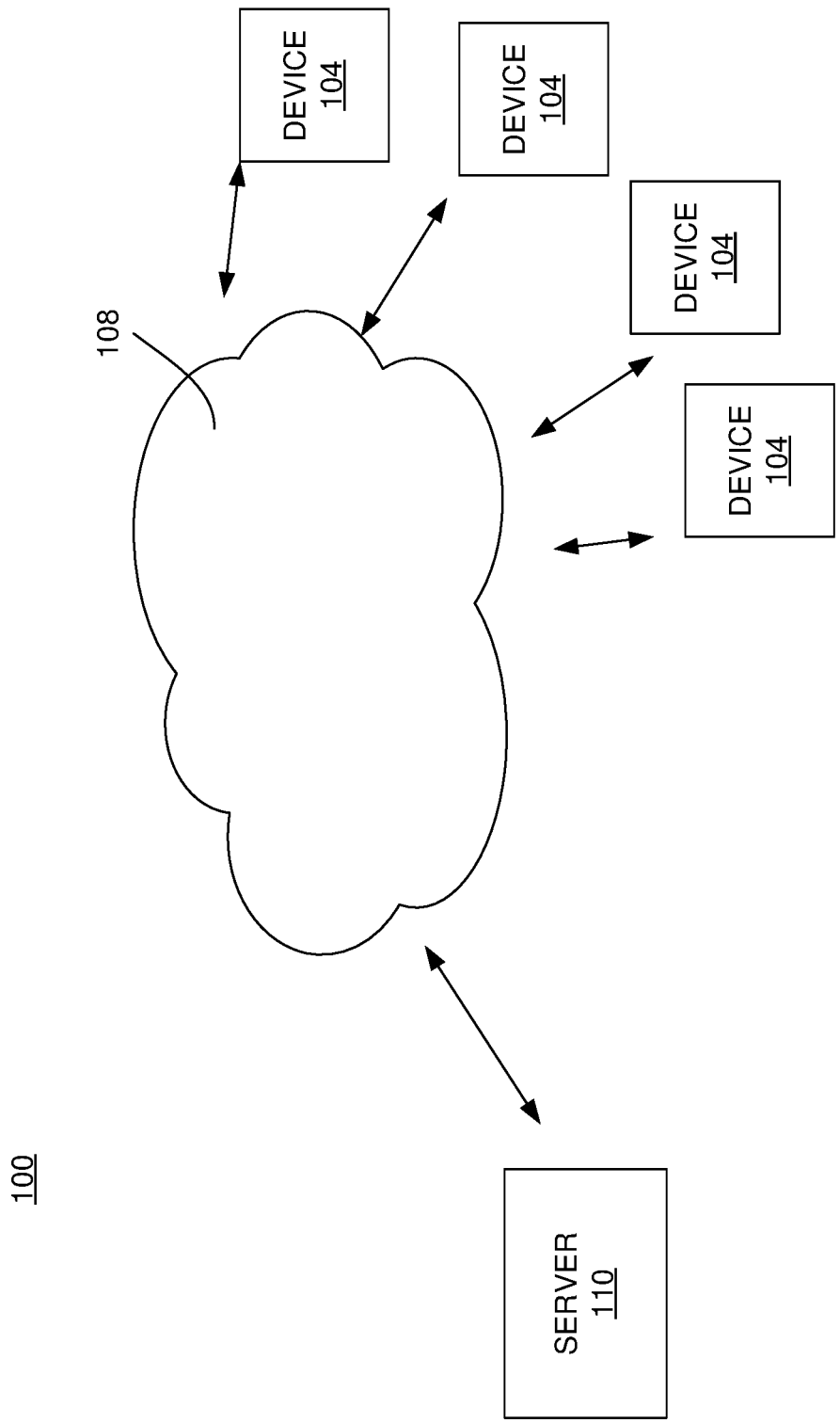
FIG. 1 is a block diagram of a system for operating a virtual agent according to a particular embodiment of the present invention.

Various implementations of the present invention address one or more of the above issues. Referring initially to FIG. 1, a system 100 for operating a virtual agent according to a particular embodiment of the present invention will be described. The system includes multiple virtual agent devices 104 and a server 110, which communicate with one another using one or more networks 108. It should be appreciated that the use of the server 110 is optional and that in some applications, any of the functionality and features for the server 110 may be modified, eliminated and/or implemented at one or more virtual agent devices 104.

Any suitable network 108 may be used to connect the devices 104 and the server 110. In various embodiments, the network 108 involves but is not limited to a cellular network based on CDMA. GSM, the Internet or any other suitable protocol or any other communication network.

In this example, a user is interacting with the devices 104, which include a refrigerator, a television, a phone and/or a smartwatch. In other embodiments, the user may be interacting with any number of different devices, e.g., a virtual reality device, smart glasses, a tablet, a computer, a laptop, etc.

In this particular example, a virtual agent is in part a software application that is running on each of the devices. Each device displays a visual model or form that represents the virtual agent, although in some embodiments, one or more of the devices does not display a model and instead supports other aspects of the virtual agent (e.g., processing of data, sensing of the environment, etc.) In some embodiments, the virtual agent is represented by a three dimensional figure or face, although in other embodiments it is represented by a two dimensional form.

The devices each include one or more sensors e.g., a microphone, a camera and/or other technologies that are used to determine a context around the user. For example, they can detect what the user is doing or holding, how he or she appears and/or what the user is saying. Based on the context, which is determined by the devices, the virtual agent can formulate replies to the user. For example, the user may ask questions, and the agent can provide answers and/or display information.

As will be discussed in greater detail later in the application, the virtual agent has a simulated personality, emotions and/or mood. Sometimes, its responses are affected by the simulated personality and are not entirely dependent on the current context or on what the user just asked. As a result, the virtual agent can appear to be more human-like i.e., it appears to have independent predispositions and attitudes that are not merely reflective of the current context. This can help facilitate a more natural, realistic dialogue between the virtual agent and the user.

The virtual agent also uses its visual form to make gestures or generate expressions. Such visual effects are based on the context and content of the interaction between the user and the agent, the sensor data, the emotions and/or simulated personality of the virtual agent. For instance, consider an example where the virtual agent is represented by a human-like form, with a face and a body. If the user makes a provocative or critical comment, the virtual agent may frown. If the virtual agent determines that a statement it will make will be troubling to the user, the virtual agent may look down, fidget or seem nervous, much as a human might.

The virtual agent's expression, emotions, mood, gestures and/or replies may be based on a sharing of sensor data and information between the various devices. For example, each device may share a history of interactions with the user (e.g., the refrigerator may store information on recent food purchases or consumption patterns, the smartphone may store information on who was called, a laptop may store information on movies that were watched or searches that were made, etc.) Each device may also include a sensor, camera and/or microphone that detects different aspects of the context around the user. The devices can use the network to share this information, such that the virtual agent can take all of the shared information into account in formulating a response to the user. Various example implementations of the virtual agent, its personality and emotions, the sensing of a context and the scheduling of agent responses/behaviors will be described in greater detail below.

The term "virtual agent" referred to herein includes any hardware or software that is suitable for generating, operating, controlling and displaying a simulation of a person, personality, being or entity. As described in this application, a virtual agent may include and be represented by a virtual agent model.

The term "virtual agent model" referred to herein includes any viewable model or form that represents the virtual agent. In some embodiments, the virtual agent model is a three dimensional model that is rendered to produce an image of the virtual agent, although it also may be a two dimensional model. The virtual agent model may take any suitable form e.g., a face, a human body, an animal, etc. A virtual agent model is displayed using any suitable display or projection technology e.g., a virtual reality device, a display screen, a screen of a tablet or smartphone, etc. In some embodiments, the virtual agent model is replaced or supplemented by a physical, tangible form e.g., a robot. Generally, the virtual agent model is capable of moving or animating to perform gestures or motions.

The term "agent personality" referred to herein includes any hardware or software that helps simulate a personality for the virtual agent. Any suitable personality model may be used. In some embodiments, for example, the agent personality includes one or more personality components that each represent a different personality trait or characteristic e.g., openness to experience, conscientiousness, extroversion, agreeableness, neuroticism etc. In various embodiments, each personality component is associated with a personality parameter that indicates a strength of this trait/characteristic. For instance, an example agent personality may include an extroversion component (personality component) with a parameter of 0.8 on a scale of 0 to 1, indicating that the virtual agent should simulate a highly extroverted personality. (In this example, 0 indicate a total absence of the personality trait, while 1 indicates the highest possible amount of the personality trait.)

The term "agent emotion" referred to herein includes any hardware or software that helps simulate an emotional state for the virtual agent. Any suitable emotion model may be used. In some embodiments, for example, the agent emotion includes one or more emotion components that each represent a different emotion trait or characteristic e.g., positive activation, negative activation, pleasure, arousal, dominance, anger, disgust, fear, happiness, sadness, surprise, etc. In various embodiments, each emotion component is associated with an emotion parameter that indicates a strength of this trait/characteristic. For instance, an example agent emotion may include a happiness component (emotion component) with a parameter of 0.8 on a scale of 0 to 1, indicating that the virtual agent should simulate being very happy. (0 indicate a total absence of the emotion trait, while 1 indicates the highest possible amount of the emotion trait.)

The term "agent mood" referred to herein includes any hardware or software that helps simulate a mood for the virtual agent. Any suitable mood model may be used. In some embodiments, for example, the agent mood includes one or more mood components that each represent a different mood trait or characteristic e.g., engagement, agreement, relaxation, etc. In various implementations, each mood component includes a mood parameter that indicates a strength of this trait/characteristic. For instance, an example agent mood may include an agreement (mood component) with a parameter of 0.8 on a scale of 0 to 1, indicating that the virtual agent should simulate a highly agreeable mood. (0 indicate a total absence of the mood trait, while 1 indicates the highest possible amount of the mood trait.)

It should be appreciated that an agent emotion or agent mood is not required in every virtual agent. The agent personality, emotion or mood may also be related to one another and/or depend on one another. In some embodiments, for example, the agent personality does not change and/or only changes when specifically and directly adjusted by a user. In various implementations, the agent emotion changes more rapidly than the agent mood.

Additionally, changes in the agent mood may be based in part on the agent emotion. In some embodiments, for example, the agent mood is based at least in part on a moving average of the agent emotion. (Put another way, in various embodiments, this means that one, some or all of the component parameters of the agent mood are based on a moving average of one, some or all of the component parameters of the agent emotion.) The moving average is calculated over a predefined period of time. Thus, while agent emotion may change greatly in response to a particular user action, the agent mood tends to change less in response to the same action.

The term "behavior" referred to herein includes any observable change in the virtual agent i.e., a visual change in the virtual agent model or an audio change (e.g., the generation of simulated speech or sounds.) In various embodiments, the agent behavior includes gestures and expressions performed by the virtual agent model e.g., a frown, a blink, a smile, a moving of the lips when speaking, etc. A behavior also includes a speaking action e.g., when a virtual agent simulates speech by generating spoken words through the playing of a voice recording or audio file. Some behaviors involve both audio and visual elements e.g., lips on a model are made to move and are synchronized with speech emitted from a speaker on a virtual agent device 104.

In various implementations, each behavior includes or is associated with one or more parameters (although this is not a requirement). Each parameter indicates a strength, intensity, extent or amount of a corresponding feature/characteristic of the behavior. Parameters may indicate a wide variety of different features/characteristics, including but not limited to the speed at which a behavior is implemented, duration of the behavior, extent of the behavior (e.g., range of motion involved in the behavior), etc. In various embodiments, the parameter is represented by a number, value, level, vector or scale (e.g., a scale of 0 to 1, where 0 indicates a minimal implementation of a feature of the behavior and a 1 indicates a very strong implementation of the feature.) To use a simple example, if the behavior is a smile of the virtual agent model and is associated with a parameter range of 0 to 1, then a parameter value of 0.1 means that the behavior is a very brief smile with minimal movement of the lips, while a parameter value of 1.0 means that the behavior is a longer lasting smile involving a much more substantial movement of the lips.

The term "interaction context" referred to herein includes any sensed or detected characteristic, condition or parameter of an environment, object or entity that is in the vicinity of the user. The interaction context includes but is not limited to a communication context, target information, situation information and/or people information, which are defined below. In various embodiments, the interaction context is obtained through the analysis of sensor data e.g., visual data such as video or images captured of the user, other people and/or the user's surroundings, audio data such as speech captured of the user, etc.

The term "communication context" referred to herein includes any characteristic, pattern or feature of audible speech. Such speech may be uttered, for example, by the user of the virtual agent or by other nearby people. Communication context may involve any feature or characteristic of speech, including surface text, semantics, general speech acts/tendencies (e.g., agree, disagree, question, inform, suggest, warn, approve criticize, confirm, etc.), functional speech units (e.g., affirmation, contrast, quantification, emphasis, etc.) and behavior hints (e.g., word stress, phoneme timing, etc.)

The term "target information" referred to herein includes any characteristic of an object near the virtual agent, a virtual agent device (e.g., devices 104 in FIG. 1) and/or the user. Any suitable object may be part of the target context, including a person, chair, table, vehicle, computer, etc. The target information may involve any characteristic of the object, such as its position.

The term "people information" referred to herein includes any traits, characteristics and/or mannerisms of one or more people detected near the virtual agent device. People information includes but is not limited to the identity of a person (e.g., their name and any known history regarding the person), physical position of the person, gaze information, gaze tracking, detected expression of the person, detected gesture of the person, image-based pose and gesture analysis, vocal tone/stress, speech information, detected emotion or mood of the person, etc.

The term "agent state" referred to herein includes (current) activity, emotion, mood and/or personality of the agent. Agent activity is an activity or behavior that the virtual agent model and/or virtual agent is simulating or performing. For example, the virtual agent may be "thinking" (e.g., processing sensor data or interaction context data). "talking" (e.g., playing a synthesized voice utterance that simulates speech from the agent), or "listening" (e.g., the agent is not speaking and is capturing audio voice data from the user. In various embodiments, the agent state also includes the (current) state of the agent emotion, personality and/or mood. In some implementations, the agent state includes a history of past behaviors, activities or operations.

Figure 2:
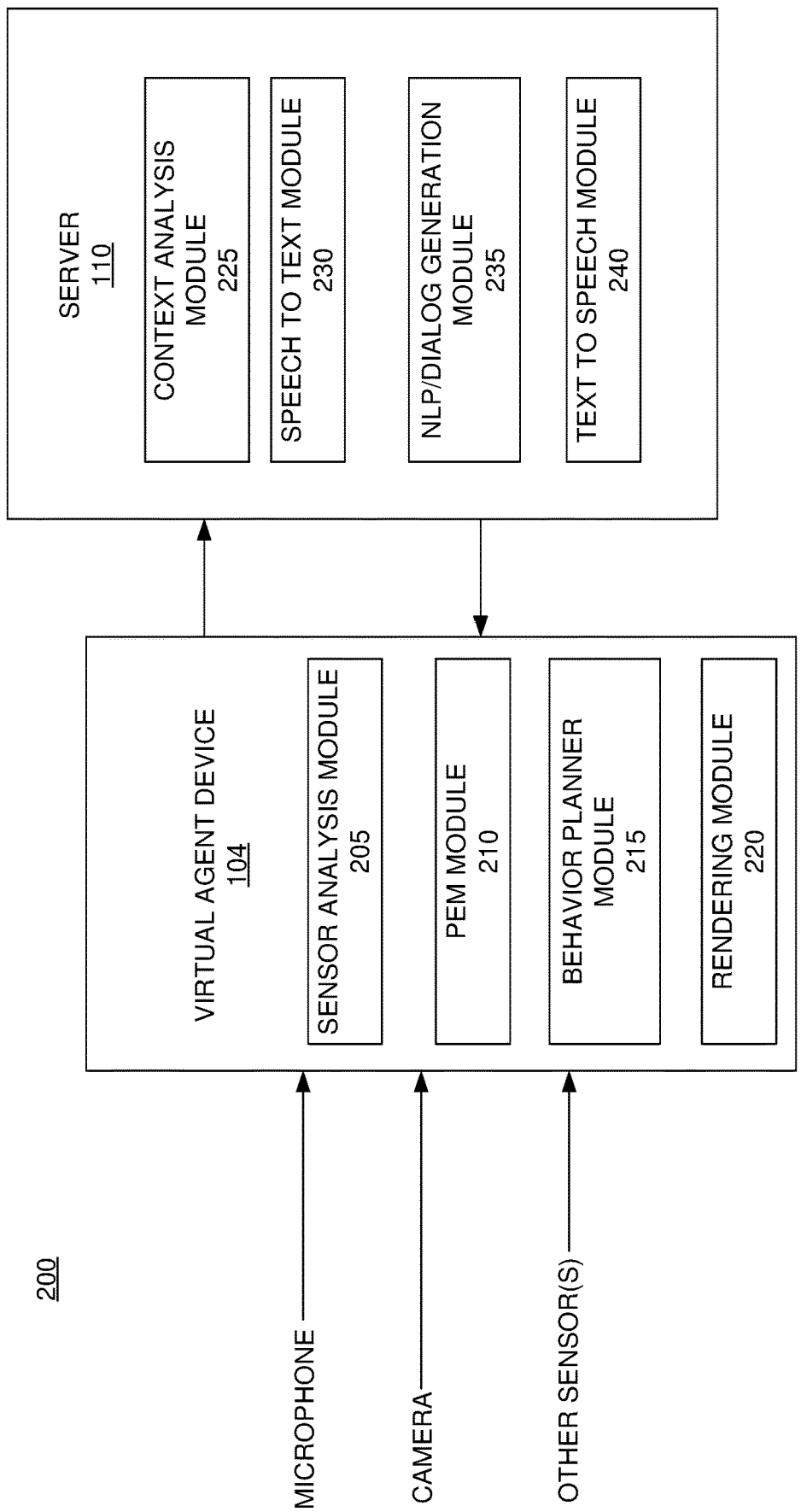
FIG. 2 is a block diagram of a virtual agent system according to a particular embodiment of the present invention.

Referring next to FIG. 2, a virtual agent system 200 for operating a virtual agent according to a particular embodiment of the present invention will be described. The system 200 includes a virtual agent device 104 and a server 110. Sometimes, the system 200 is referred to herein simply as a virtual agent. The virtual agent device 104 and server 110 may be the device and server illustrated in FIG. 1.

The virtual agent device 104 is any suitable computing device that is arranged to support one or more functions of the virtual agent. For example, the virtual agent may be any suitable computing device, including but not limited to a smartphone, smart glasses, a virtual reality device/goggles, a refrigerator, a household appliance, a laptop, a computer, a tablet, etc. The device may have any of the characteristics of the device 104 illustrated in FIG. 1 or FIG. 7. In the illustrated embodiment, the virtual agent device 104 includes a display screen/technology, which is arranged to display and animate a model of the virtual agent.

In this example, the virtual agent device 104 includes a microphone, a camera and one or more other types of sensors. Any type of sensor may be used e.g., a light sensor, a motion sensor, a temperature sensor, a humidity sensor, etc. The microphone is arranged to detect, obtain and/or capture audio data (e.g., a voice of a user, music or sounds in the background, etc.) The camera is arranged to obtain any suitable visual data i.e., video and/or images of the environment, objects or people around the virtual agent device. The microphone, camera and sensors collect audio, visual and other types of sensed data (collectively referred to herein as sensor data) and provide the sensor data to modules in the device.

The device 104 includes multiple modules, including a sensor analysis module 205, a personality/emotion/mood module (PEM module 210), a behavior planner module 215, and a rendering module 220. In various embodiments, each module includes any suitable hardware or software necessary to perform its respective functions, as described below.

The sensor analysis module 205 is any hardware or software arranged to obtain and analyze sensor data received from the microphone, camera and/or other sensors. In various embodiments, the module 205 shares the task of analyzing the data with the context analysis module 225, which in this example is situated at the server 110, although in may also be situated in another device (e.g., the virtual agent device 104.) Under some conditions, it is desirable that some pre-processing of the audio/visual/sensor data takes place before it is transmitted to the server 110 for further processing.

The sensor data may be analyzed and processed in a wide variety of ways. For instance, consider an example in which the camera captures images or video of a user smiling at the virtual agent. Rather than transmitting the entire video to the server 110 for analysis, the device 104 may instead analyze and process the video data. In some embodiments, for example, the sensor analysis module 205 identifies feature points in the face of the user i.e., points in the face that move in different ways when the expressions in the face change. Examples of such feature points include points at the corners of the mouth or a point on an eyebrow. In this example, the sensor analysis module 205 analyzes the video to determine how much one or more feature points moved when the user smiled, and then transmits data indicating the feature point movement to the server 110 (e.g., the context analysis module 225.) This approach generally consumes less bandwidth than if the video/images themselves were transmitted. Any suitable type of preprocessing of visual/audio/sensor data may take place at the sensor analysis module 205. Alternatively, much or all of the processing may take place instead on a remote server 110 (e.g., at the context analysis module 225.)

The PEM module 210 is any hardware or software arranged to store and update the agent personality, mood and emotion. In some embodiments, for example, the virtual agent system 200 detects a particular event, characteristic, trait or attitude (e.g., a smile of a user, pleasant conversation from a user, criticism, a negative attitude on the part of the user, other visual or sensed events or conditions, the interaction context, etc.) using the sensor analysis module 205, context analysis module 225, speech to text module 230, microphone, camera and/or other sensors. Based on such feedback, the PEM module 210 may update the mood and/or emotion.

In various embodiments, the personality is not updated based on the interaction context or events, but in other embodiments, repeated events can gradually adjust the personality over time. By way of example, in some applications, the personality is configured by a user who interacts with the virtual agent/virtual agent model. In other applications, the personality is set or predefined by default. The personality may also be adjusted to imitate a known character/person (e.g., a known entertainment character, a famous historical character, a well-known fictional character, etc.) The personality may also be based on the type or nature of the service provided by the virtual agent. In various embodiments, the personality is adjusted based on changes in the way a user interacts with the virtual agent e.g., the personality is adjusted to adapt to the user's preferences. In other embodiments, the personality is selected programmatically by a particular application. For example, a particular training/education application may adjust the personality in order to help educate a user in how to deal with different social interaction scenarios. Additionally, in various implementations, the personality is adjusted on-the-fly based on context (e.g., the interaction context.) Some example operations performed by the PEM module are described later in connection with the method illustrated in FIG. 3.

The behavior planner module 215 is any hardware or software arranged to select, schedule and help implement one or more behaviors. Behaviors may involve any kind of visual change, expression or gesture in the virtual agent model. For example, behaviors may include an animated shrug, smile, frown or a furrowed brow in a model of a face that represents the virtual agent. Behaviors may also involve audio information e.g., words "spoken" by the virtual agent. Based on the sensor data, emotion, the interaction context and/or other events/conditions the behavior planner module 215 is arranged to prioritize and/or select one or more behaviors. The selections are then transmitted to the rendering module 220 so they can be implemented using the virtual agent model. Example operations for the behavior planner module are described later in connection with FIG. 4.

The rendering module 220 is any hardware or software arranged to display the virtual agent model, which visually represents the virtual agent. By way of example, the rendering module may display a two- or three-dimensional model of a face, human, avatar or other character that represents the virtual agent. The rendering module is also arranged to implement visual changes or behaviors at the virtual agent model e.g., shrugs, smiles, etc.

The rendering module 220 receives behavior data from the behavior planner module, which indicates one or more behaviors that should be implemented at the virtual agent model. The behavior data may also indicate timing information i.e., information indicating when each behavior should be rendered. The rendering module then renders the behaviors based on the received behavior data. The virtual agent model and the behaviors may be rendered using any known rendering or graphics technology e.g., a 3D graphics engine, a video display screen, a virtual reality display technology, a graphics processing unit (GPU), etc.

The virtual agent device 104 is coupled with the server 110 through a network 108. As previously noted, sensor data is received at the virtual agent device 104 (e.g., through the microphone, camera and sensors.) The sensor analysis module may process some of the sensor data (e.g., at the sensor analysis module 205.) The virtual agent device 104 then transmits the sensor data to the server 110 through the network 108.

In various embodiments, the server 110 is arranged to perform various data processing tasks to help reduce the processing burden on the virtual agent device. Additionally, the server 110 may store copies of the data and/or modules stored at the virtual agent device 104, so that other devices may connect with the server 110 and access the virtual agent data. It should be noted, however, that any of the operations performed by the server 110 may instead be performed at the virtual agent device 104 (and vice versa). In the illustrated embodiment, the server 110 includes a context analysis module 225, a speech to text module 230, a natural language processor (NLP)/dialog generation module 235 and a text to speech module 240.

The context analysis module 225 is arranged to analyze the sensor data received from the virtual agent device 104 (e.g., the sensor analysis module 205.) Based on the analysis, the module 225 determines features, patterns, trends or characteristics that may inform the way the virtual agent behaves or acts in the future. Put another way, the context analysis module 225 uses the sensor data to determine an interaction context, which includes one or more of the communication context, situation information, target information and people information, as previously defined.

Consider an example in which a user is speaking to a virtual agent from his bedroom. The camera obtains video/image of the user's expression and surroundings as the user is speaking. The microphone obtains the words and speech of the user. Various other sensors may detect the temperature or light levels in the room, or other features of the environment surrounding the user. The virtual agent device 14 transmits this sensor data to the server 110, where it is processed by the context analysis module 225.

The context analysis module 225 may identify features or traits (e.g., the interaction context) using any suitable technology or technique. In some embodiments, for example, the context analysis module analyzes video or images of the face to determine changes in the facial movements, gaze and expressions of the user. Based on the detected movements, the module 225 may determine the user's mood or emotion. The context analysis module 225 may also identify, for example, where the user is based on images of the surrounding environment e.g., a bed indicates a bedroom, a sink or refrigerator indicates a kitchen. In some embodiments, the context analysis module 225 distills the sensor data into one or more characteristics, traits and conditions e.g., the user is sad, the user is happy, the temperature is cold where the user is, the user is in a bedroom, at school or in the kitchen, the user is with friends or alone, etc. The context analysis module 225 then transmits these determined characteristics, traits and conditions (i.e., the interaction context) to the virtual agent device 104 (e.g., to the behavior planner module 215 and the PEM module 210), the NLP/dialog module 235 and/or other modules/devices as appropriate.

In this example, the context analysis module 225 passes any speech-related data (e.g., voice data captured by the microphone) to the speech to text module 230. The speech to text module 230 is arranged to convert the speech to text, so that it can be readily analyzed and/or interpreted. The speech to text module 230 then transmits the text to the NLP/dialog generation module 235. In some embodiments, the speech to text module 230 is incorporated into the context analysis module 225.

The NLP/dialog generation module 235 is arranged to generate a script that will later be spoken by the virtual agent. The script is based on the sensor data, interaction context (e.g., as determined by the context analysis module 225) and/or detected speech (e.g., as determined by the speech to text module 230.) Put another way, the NLP/dialog generation module 235 generates a script that represents what the virtual agent will say in response to events or conditions that are detected by the virtual agent. To use a simple example, if the virtual agent has detected from visual analysis that the user is sad, and further "hears" words spoken by the user indicating that the user is worried, then the NLP/dialog generation module 235 may generate an appropriate script such as, "Are you feeling alright? You seem troubled by something."

The NLP/dialogue generation module 235 transmits its script to the text to speech module 240. The text to speech module 240 is arranged to convert the script into an audio message/sounds e.g., a simulated voice or voice recording. The words may be stored in any suitable audio data format. The NLP/dialogue generation 235 module may use any suitable text to speech technology to perform the conversion. In various embodiments, the module 235 adjusts speech characteristics or settings (e.g., emphasis, accent, speech speed, slurring, clarity, etc.) based on the interaction context.

The text to speech module 240 transmits the above audio data to the behavior planner module 215. The behavior planner module may also receive additional interaction context data from the context analysis module 225. Additionally, the behavior planner module 215 may access data stored at the PEM module 210. Based on the received/accessed data, the behavior planner module 215 is arranged to render appropriate visual changes in the virtual agent model. For example, if the behavior planner module 215 receives speech data from the NLP/dialogue generation module 235, the module 215 may cause the lips of the virtual agent model to move in tandem with the spoken speech. In another example, if interaction context data received from the context analysis module 225 indicates that the user has a particular mood or emotional state (e.g., nervous, happy, sad, etc.), then the behavior planner module 215 may schedule behaviors that are associated with such emotions (e.g., a nervous blinking of the eyes, a smile, a frown, etc.)

Figure 3:
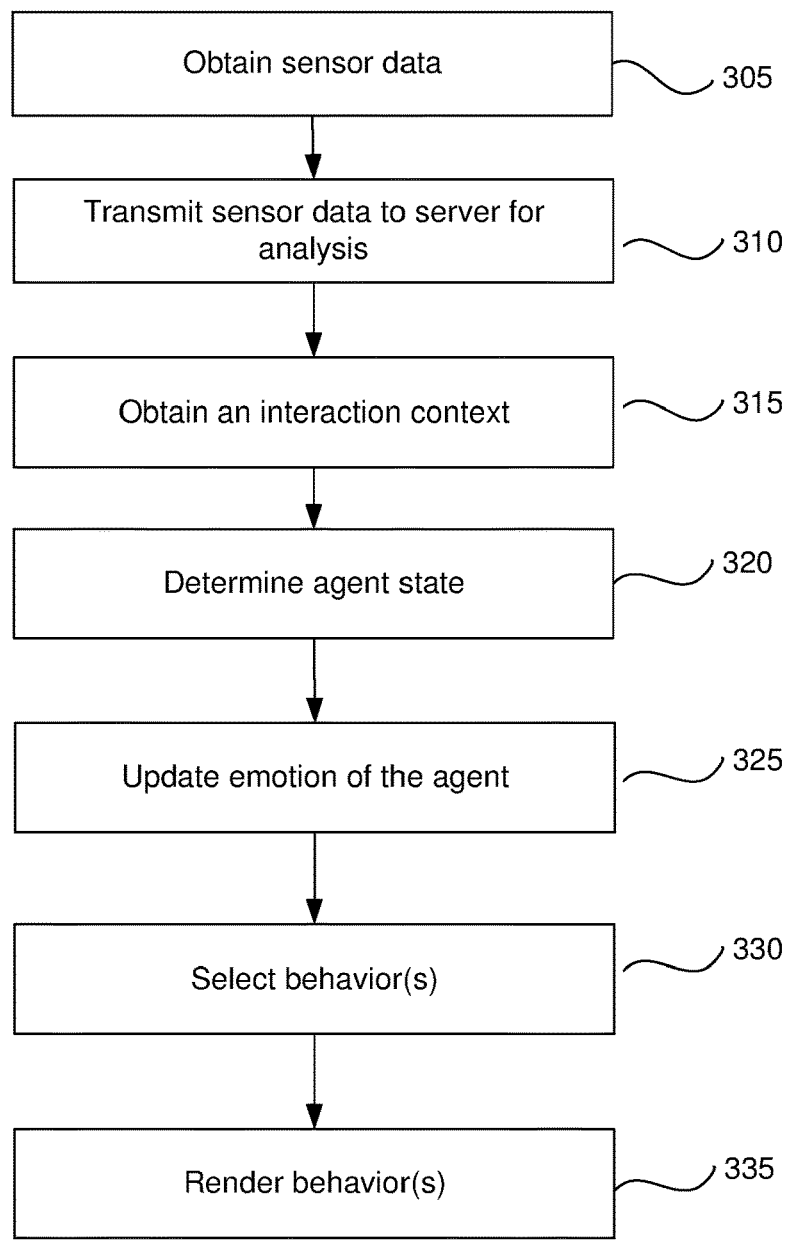
FIG. 3 is a flow diagram illustrating a method for operating a virtual agent according to a particular embodiment of the present invention.

Referring next to FIG. 3, a method for operating a virtual agent according to a particular embodiment of the present invention will be described. The method may be performed using the virtual agent system 200 illustrated in FIG. 2.

Initially, at step 305, the virtual agent device 104 obtains sensor data. This may be performed in any suitable manner. In some embodiments, for example, a virtual agent device 104 includes various sensors, such as a camera, a microphone or other types of sensors. The device obtains visual data (e.g., video or images), audio data (e.g., voice recordings, recorded sounds, etc.) and any other suitable sensor data (e.g., any parameter, condition or characteristic sensed in the ambient environment, such as light levels, motion, RF signals, etc.)

Although this example involves a single virtual agent device, it should be appreciated that the sensor data may be collected by multiple devices simultaneously, and the collected data may then be shared via a network 108 or directed to a particular device 104 and/or the server 110. Consider an example in which a user is in the living room and is interacting with a virtual agent displayed on a smartphone. A television, which includes a camera and microphone, is also in the living room. Both the television and the smartphone may collect sensor data in the area around the user. For example, the television may have a different perspective and field of view than the smartphone, and thus may captures images of different objects and backgrounds. Sensor data collected by the devices is shared (e.g., transmitted through a network 108 to a primary virtual agent device, which could be the smartphone or television) and/or transmitted to a server 110 for further processing as described below.

At step 310, the virtual agent device 104 transmits the sensor data to a server 110. More specifically, in this example, the virtual agent device 104 transmits the sensor data to the context analysis module 225 for further processing. (It should be noted that this step is optional. For instance, in various embodiments, there is no server and/or the context analysis module 225 is at the virtual agent device 104. Thus, the sensor data may not need to be transmitted as described above.) As previously noted, the virtual agent device 104 (eg., using the sensor analysis module 205) may pre-process some of the sensor data before transmission, as previously discussed.

At step 315, the server 110 (e.g., the context analysis module 225) obtains an interaction context based on analysis of the sensor data. As noted in the Definitions section of this application, the interaction context may include a variety of types of information, including but not limited to the communication context, target information, situation information and people information. Example operations for obtaining each of these types of information are described below.

In various embodiments, the server obtains target information. That is, the context analysis module 225 may analyze the sensor data (e.g., image and video data captured by a camera) to identify objects near the user. The module 225 may then determine the nature and position of the objects. Consider an example in which a camera on the virtual agent device 104 has captured video or images of a user and his surroundings. Based on an analysis of this data, the context analysis module 225 determines that the user is named Joseph Smith and has an associated account profile that accessible to the server and/or the virtual device. Additionally, the user is sitting in a chair, is within three feet of a sofa, and is holding a cup of some kind of liquid. Another person is also standing near Joseph.

In various embodiments, the server 110 also obtains people information. That is, the context analysis module 225 analyzes the sensor data (e.g., image and video data captured by a camera) and determines characteristics of any sensed people e.g., their identity, position, gaze information, speech information, emotion or mood. Consider the above example, in which images/video of the user Joseph Smith and another person are captured. Based on such data, the content analysis module 225 determines that the user is gazing intently at the virtual agent model/virtual agent device and is speaking to the virtual agent. It further determines that the other person is gazing away. Additionally, an analysis of the face of the user indicates that the user is slightly smiling and thus the context analysis module 225 determines that Joseph Smith is happy. It should be note that any known technologies or algorithms for detecting/tracking movements, eye rotation, eyelid/eyebrow movement, gaze, gestures and facial expressions may be used to determine people information. For example, any technique described in co-assigned U.S. patent application Ser. No. 14/801,574, which is incorporated herein by reference in its entirety for all purpose, may be used.

In various embodiments, the server 110 also obtains situation information. That is, the context analysis module 225 analyzes the sensor data (e,g., audio data captured by a microphone, image/video data captured by a camera, etc.) and determines characteristics of the local environment or situation e.g., is the user indoors or outdoors, is he/she at home, in the living room, out shopping, in a car, what activity is the user currently involved in, etc.) Consider an example in which the microphone is picking up ambient sounds and a camera is capturing images of the environment around the user. Based on the analysis of the sounds, the context analysis module 225 may determine that the user is in a car stuck in traffic, or is in outdoors in a busy street or mall. Based on analysis of the images, the context analysis module 225 may determine that the user is playing golf (because the images indicate the user is holding and swinging a golf club) or is drinking coffee (because the images indicate the user is drinking from a cup labeled with the name of a known coffee company.)

In various embodiments, the server 110 also obtains a communication context. That is, the server 110 (e.g., the context analysis module 225, the speech to text module 230, the NLP/dialogue generation module 235) analyzes the sensor data (e.g., audio data captured by a microphone) to determine characteristics of the dialogue or speech of the user. By way of example, a user's voice may be analyzed to determine whether it indicates particular attitudes or feelings (e.g., happy, sad, agreement, question, etc.) Additionally, the voice may be analyzed to determine other tendencies or characteristics, such as intonation, accent, word stress, and phoneme timing.

At step 320, the server 110 determines the agent state. That is, the server 110 determines what kind of activity the virtual agent is currently involved in. Additionally, in some embodiments, the server 110 obtains data indicating the current mood, emotion or personality of the agent.

In some implementations, there are multiple possible categories of activity that are pre-defined for the virtual agent, and the server 110 determines at step 315 which category corresponds to the current state of the virtual agent. Possible categories include but are not limited to "thinking" (e.g., the virtual agent device 104 or server 110 is currently involved in processing sensor data or other data), "listening" (e.g., the virtual agent device 104 is recording voice data from the user and/or the virtual agent model currently has a gesture or expression indicating that it is in a listening mode) and "speaking" (e.g., the virtual agent device 104 is playing a voice message/recording and/or the virtual agent model is animated to simulate lip movements and/or other indications of speech.) Another possible category is "idle" (e.g., there are no (high priority) events or user actions that the virtual agent device 104 or server 110 are responding to.)

At step 325, the PEM module updates the emotion or mood of the virtual agent. In various embodiments, the update is based on the interaction context (e.g., as determined by the context analysis module 225 and/or the server 110), the agent state and/or the personality of the agent. The server 110 may adjust these parameters based on a wide variety of variables, including but not limited to user actions, sensed objects or conditions in the ambient environment, the interaction context, the current activity of the virtual agent, the expression or gestures of the user, etc.

A wide variety of techniques and algorithms may be used to adjust agent emotion. For instance, consider an example in which the emotion components for a particular virtual agent include surprise, happiness and sadness. In various embodiments, if the context analysis module 225, based on sensor data, determines that a user is smiling or is saying kind things about the virtual agent, then the sadness parameter for the sadness component may go down and the happiness parameter for happiness component may go up.

Similarly, if the context analysis module 225 determines that a sudden, surprising event occurred (e.g., the camera detects that the user dropped and shattered a cup, or another person suddenly lunges at the camera of the virtual agent device 104), the surprise component may be adjusted upward. The server 110 may associate any type of interaction context, event, phenomenon or characteristic with an adjustment in any suitable emotion component.

Some implementations involve adjusting the emotion differently from the mood. In various designs, the virtual agent attempts to realistically simulate the emotional ebb and flow of an actual human being. That is, human beings may have fairly rapid emotional reactions to immediate events. Additionally, human beings also are affected by moods, which may be shaped not simply by recent events, but rather can be shaped by events that have taken place over a long period of time. For example, a person may be in a sad mood even if fun or amusing events are occurring around him and her, as a result of past, prolonged exposure to sad or disappointing events.

In a similar fashion, agent mood may change in a different manner and/or rate than agent emotion. In some implementations, for example, agent mood is based on changes in agent emotion over a period of time. For instance, agent mood may be based on a moving average of the parameter values for one or more emotion components over a predefined period of time. To use a simple example, consider a virtual agent with a mood component representing agreement. The virtual agent also has emotion components representing positive activation, pleasure and happiness. In this example, the parameter value of the agreement mood component (e.g., a value from 0-1) is based on an average of the parameter values of the positive actuation, pleasure and happiness components (e.g., each also having values from 0-1) over a 30 minute period. Thus, even if the emotion components jump between extreme highs and lows i.e., increases and decreases rapidly over the course of the day (which may mean that very calming and very agitating events have occurred one after the other), the mood component may not change much and/or have a mid-level parameter value.

Additionally, in various implementations, adjustments of the emotion and/or mood are based on the agent personality. In some designs, the agent personality is intended to simulate the actual personality of an actual human being, which generally does not change or changes very slowly. Put another way, it constantly predisposes the virtual agent to certain types of reactions and responses in a consistent fashion. This can make the virtual agent more human-like, in that it appears to have particular tendencies or predispositions, rather than always reacting logically to whatever request a user gives it.

Consider the following simple example. The PEM module 210 stores a personality, which includes various components. The components represent traits such as conscientiousness, extroversion, agreeableness and neuroticism. Each component also has a parameter value from 0-1, indicating the strength of the corresponding trait. Thus, if the extroversion value is 1, the virtual agent will tend to behave like a very extroverted person; if the virtual agent has an extroversion value of 0, the virtual agent will behave in an extremely timid and introverted fashion.

The personality can affect the impact of events and conditions on the emotion and mood of the virtual agent. For instance, assume that the virtual agent has an emotion component that represents anger. Currently, it is at a low level (e.g., at 0.1 on a parameter scale of 0-1.) A user has just interrupted the virtual agent while the virtual agent was "speaking" (i.e., a category of agent state, which indicates that the virtual agent was imitating speech and playing a voice message/recording.) If the agent personality has a high value for neuroticism (e.g., neuroticism parameter=1), then the emotion component (anger) may skyrocket (e.g., from 0.1 to 0.9.) However, if the agent personality has a low value for neuroticism (e.g., neuroticism parameter=0.5) then the emotion component may increase only very slightly (e.g., from 0.1 to 0.5.) As will discussed later in the application, the differences in the changes in the agent emotion can then lead to corresponding differences in behavior implemented by the virtual agent. By way of example, in the former case, the virtual agent model may exhibit an angry expression or posture, while in the latter case, the virtual agent model may merely shrug or blink slightly more rapidly.

Agent personality itself may be permanent, semi-permanent or adjustable. In some implementations, for example, the personality is permanently fixed. In other embodiments, a user has a specific option to adjust the personality. That is, the user can specifically set the parameter values for the personality components using a particular user interface. However, agent personality is still not adjusted based on day-to-day events or conditions e.g., the interaction context. In other designs, an agent personality is affected by the interaction context, changes in the agent emotion and/or other events, but only slowly over time e.g., in a similar manner as mood, but over an even longer time period, such as a month, six months or a year.

In still other embodiments, the agent personality is predefined based on the type of service that the agent provides or the type of role that the agent plays (e.g., the personality for an agent that is intended to simulate a hotel help service may be different from one that is intended to serve as a virtual friend or companion.) The virtual agent and its personality may be tailored for a wide variety of roles/tasks, including but not limited to personal agent/assistant, personal companion, famous historical or fictional character, aide for the disabled/elderly, virtual reality guide, home manager, tutor, guide for children, medical agent, service center assistant, etc.

In some implementations, the current activity (i.e., agent state) of the virtual agent can influence how the virtual agent's emotion, mood or even personality are affected by particular events or user actions. For instance, consider an example in which the virtual agent is in the midst of "talking" i.e., an agent state category in which a voice message/recording is being played that simulates the speech of the virtual agent, and the virtual agent model is animated in a manner that imitates speech and the moving of lips. If, at this time, the user speaks, thus interrupting the virtual agent, the effects on the agent's response, mood or emotion may be different than if the user had spoken when the virtual was in a "thinking" or "listening" mode. For example, the agent mood or emotion may become more negative than it otherwise would be, and the verbal response of the agent may indicate greater apprehension or irritation.

At step 330, the server 110 (e.g., the behavior planner module 215) selects one or more behaviors to implement. The selection may be based on a variety of factors, including but not limited to the interaction context and the current agent emotion. A more detailed example of an implementation of this step is described later in the application in connection with FIG. 4.

The virtual agent may implement a wide variety of different behaviors. Behaviors may include various types of actions that cause a change in the animation and/or visual appearance of the virtual agent model. An example list of possible types of behavior types and behaviors are illustrated in FIG. 5. The behavior types include head gestures, facial poses, vocal behaviors, upper face pose, lower face pose, etc. Each behavior type may include any number of associated behaviors. A head gesture behavior type may include, for example, the behavior of tilting the head of the virtual agent model slightly to the left or right. The list also includes vocal responses and vocal gestures. Examples of these types of behaviors, respectively, include a spoken response from the virtual agent involving language and words, and a non-vocal response that includes an audio component but does not involve language or words (e.g., yawning, coughing, etc.) The example behaviors listed in FIG. 5 (e.g., smiling, blinking, chewing, etc.) generally refer to actions that may be simulated by animating/moving the virtual agent model. It should be appreciated that the list in FIG. 5 is intended to be exemplary and non-limiting. In some embodiments, for example, the list may contain many more behaviors e.g., if the virtual agent model is a full body model rather than a head model, then there may be many behaviors that involve motions of the body, such as walking, pointing, waving, sitting, standing, etc.

Suitable behaviors may be selected in a wide variety of ways. In some embodiments, for example, each behavior is associated with one or more tags. A tag refers to a characteristic, term or concept that is associated with the behavior and that helps determine whether the behavior should be implemented. An example chart of tag types and tags is shown in FIG. 6. Some examples of tag types include activity (e.g., agent state), environment (e.g., particular characteristics of the interaction context), agent emotion (e.g., an emotion component, possibly with an associated parameter requirement/threshold), agent mood (e.g., a mood component, possibly with an associated parameter requirement/threshold) and personality (e.g., a personality component, possibly with an associated parameter requirement/threshold.)

The tags may be used to determine which behaviors to implement. In various embodiments, the behavior planner module obtains virtual agent data indicating the interaction context, agent state, agent emotion, agent mood and agent personality (e.g., as determined in steps 305-320.) The behavior planner module then matches the tags of various behaviors with the obtained virtual agent data. For instance, consider a behavior, "smiling," that is associated with the tags "user is present in front of virtual agent device" (target information), "user gazing at virtual agent" (people information), "virtual agent is listening" (agent state) and "agent emotion component representing happiness is greater than 0.5 (agent emotion with a emotion parameter requirement.) If all the above conditions are satisfied by the current interaction context, agent state and emotion/mood/personality (e.g., as determined in steps 315-325 of FIG. 3), the behavior planner module 215 will determine that a match has been found, and will select the "smiling" behavior for implementation at the virtual agent model.

The selections of behaviors performed by the behavior planner module 215 may be based on input from any other suitable module in the virtual agent system 200. For example, interaction context data is received from the context analysis module 225 and used to help selected suitable behaviors. The NLP/Dialog generation module 235 and text to speech module 240 may provide input to the behavior planner module, indicating that a spoken response is necessary. The content of the speech may affect the implementation and nature of the behavior (e.g., the lips must move to match the words, the spoken response may include particular content that triggers another type of gesture or animation at the virtual agent model, like a smile, a blinking of the eyes, a tilting of the head, etc.)

The behavior planner module 215 may define one or more parameters for each behavior, which affects how the behavior is implemented and how the behavior appears on the virtual agent model. For instance, consider an example behavior that involves generating a smile on the virtual agent model. This smile behavior may in turn be associated with an extent parameter and a duration parameter. In this example, each parameter is a value between 0 and 1. The extent parameter defines the breadth of the smile (e.g., 0 means a neutral expression, 0.1 a smile with very limited or minimal lip movement, 1 meaning a very broad smile with the greatest possible lip/mouth movement.) The duration parameter indicates how long the smile lasts (e.g., 0.1 means an extremely brief smile, 1 means a very long lasting smile.) The behavior planner module may determine the parameters for a particular behavior based on the interaction context, agent state or emotion (e.g., as determined in steps 315-325).

Once a set of suitable behaviors has been selected for implementation, the server 110 transmits the selected behaviors (and their associated parameters, if any) to the rendering module 220 at the virtual agent device. At step 335, the rendering module 220 then renders the selected behaviors. That is, any gesture, animation, movement or expression indicated by the selected behaviors is implemented at the virtual agent model, so that it can be seen by the user or anyone else viewing the virtual agent model. Additionally, the virtual agent device 104 is arranged to generate a voice message or other audible sounds that are associated with any of the selected behaviors (e.g., a verbal response, a cough, a laugh, a snort, etc.) Such sounds are played through a speaker at the virtual agent device 104.

Figure 4:
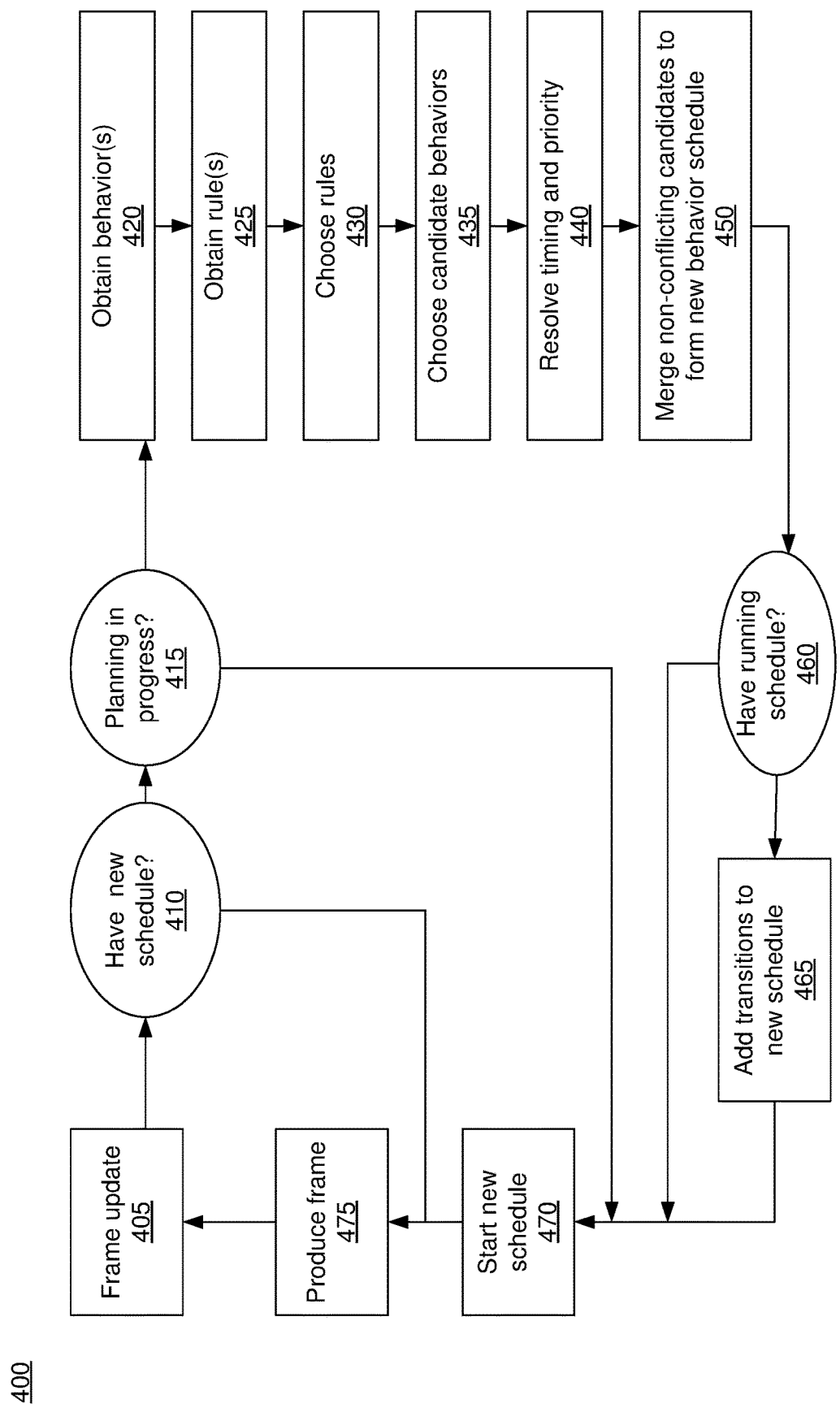
FIG. 4 is a flow diagram illustrating a method for generating a behavior schedule according to a particular embodiment of the present invention.

Referring next to FIG. 4, a method 400 for selecting and scheduling behaviors according to a particular embodiment of the present invention will be described. The method 400 may be performed by the behavior planner module 215, the server 110 and/or the virtual agent device 104. In some embodiments, the method 400 may be performed as part of step 330 of FIG. 3.

At step 405, the behavior planner module 215 begins a process for updating an existing behavior schedule and/or generating a new behavior schedule for a current/upcoming frame. The behavior schedule may be understood as a schedule for implementing one or more behaviors for one or more frames. The behavior schedule indicates the order in which each behavior is performed and/or how long each behavior lasts.

In some implementations, the behavior schedule is updated on a frame by frame basis i.e., method 400 is repeated on a frame by frame basis. (In some applications, a virtual agent model is displayed and animated at thirty, sixty or more frames per second.) In other embodiments, the selection and scheduling of behaviors may also occur less often (e.g., every 2, 4 or 6 frames.)

At step 410, the behavior planner module 215 determines whether a new schedule is required. This determination may be based on a variety of factors. For example, it may be the case that a particular behavior schedule is already running, and thus no behaviors need to be implemented for the upcoming frame. On the other hand, if there has been a new event (e.g., the user has just finished asking a question), the schedule may need to be updated immediately so that the virtual agent can respond to the new event. The trigger that causes the updating of the behavior schedule may, for example, be any change in the interaction context. If a new behavior schedule is not needed, the method 400 proceeds to step 475. That is, the existing schedule continues to be followed. If the behavior schedule needs to be updated, then the method proceeds to step 415.

At step 415, the behavior planner module 215 determines whether behavior scheduling and planning is already underway. That is, it may be that the processing resources of the server 110 and/or virtual agent device 104 are already occupied. If that is the case, the updating of the behavior schedule is delayed and the method proceeds to step 470. That is, the behavior planner module 215 finishes its ongoing processing tasks and behavior schedule and repeats the method 400. If system resources are available for the updating of the schedule, the method proceeds to step 420.

At step 420, the behavior planner module 215 obtains or accesses a behavior corpus, which is a set of predefined behaviors. Each behavior indicates a particular action performed by the virtual agent/model e.g., a visual change, gesture or expression in the virtual agent model and/or a verbal message or response. As indicated in FIG. 5, the behavior planner module 215 may arrange multiple possible behaviors into distinct types.

At step 425, the behavior planner module 215 obtains or accesses one or more rules. Each rule helps indicate when behaviors should be implemented and under what conditions. In various embodiments, a rule is any suitable data or data structure that includes a trigger, a selector and/or a priority indicator. In various embodiments, there may be any number of rules e.g., possibly dozens, hundreds or more rules that help predefine how the virtual agent will react and respond to many different types of situations.

The trigger indicates a condition that must be satisfied for the rule to be applied. The condition may involve any suitable conditions, events or characteristics e.g., agent emotion, agent mood, agent personality, agent state, interaction context as determined in steps 315-325 of FIG. 3, etc. For instance, an example of a trigger might be that 1) the virtual agent be in a "listening" mode (agent state); 2) the virtual agent's happiness component have an associated parameter value of greater than 0.5 on a scale of 0 to 1 (emotion component); and 3) the user must be gazing directly at and talking to the virtual agent/virtual agent model (interaction context.)

The selector indicates which behaviors or types of behaviors should be selected for (possible) implementation when the trigger conditions are satisfied. Put another way, the selector defines selection or search criteria for use on the behavior corpus. In some embodiments, the selector specifies tags (e.g., as previously described in connection with step 330 of FIG. 3), which are used to identify suitable behaviors. For instance, an example selector may indicate that if the trigger conditions are met, all behaviors with tags indicating a "strong happy" should be performed/considered for performance (in this example, a "strong happy" refers to an emotion component representing happiness whose associated intensity parameter is greater than 0.8 on a scale of 0 to 1.)

The priority indicator indicates the importance of the behaviors selected using the rule. For example, if two conflicting behaviors are selected based on two different rules (e.g., two behaviors that require lip movement, such as a smile and speech-related lip movement), then the priority indicators for the rules can be used to determine which of the behaviors should actually be performed by the virtual agent/model.

At step 430, the behavior planner module 215 chooses rules with behavior triggers that match the current interaction context or other ongoing events/conditions. That is, the selection of the rules is based on the interaction context (e.g., as obtained in step 315 of FIG. 3), agent state (e.g., as determined in step 320 of FIG. 3), personality/mood/emotion (e.g., as updated in step 325 of FIG. 3) and/or other parameters/conditions.

At step 435, based on the selectors associated with the chosen rules, the behavior planner module 215 selects one or more candidate behaviors. A candidate behavior is a behavior that is being considered for performance by the virtual agent model/virtual agent, but still may not be performed due to conflicts with other behaviors or for other reasons, as will be described below.

At step 440, the behavior planner module 215 determines timing and priority issues related to the candidate behaviors. That is, the candidate planner module 215 determines the order and/or specific frames at which different candidate behaviors may be performed. At this stage, the behavior planner module 215 also determines the priority of the different behaviors (e.g., based on their associated priority indicators.)

As a result of the above step, the candidate planner module 215 may determine that two or more candidate behaviors conflict. By way of example, two different rules may have led to the selection of two different candidate behaviors that require animation or control of the same body part in the virtual agent model at the same time. The candidate planner module 215 may determine, based on the priority indicator or other factors, that one behavior takes priority over the other and the other conflicting candidate behavior cannot be performed and/or is discarded. To use the above example, if one behavior involves animating the lips to simulate a response to a question from the user, and another conflicting behavior involves simulating a smile, the candidate planner module 215 may prioritize and perform the former and not the latter, since an immediate verbal response to the user's question may be considered more important than generation of a smile. Alternatively, the candidate planner 215 may determine that the smile should come immediately before or after the speech animation.

At step 450, once conflicts have been resolved, the candidate planner module 215 merges the non-conflicting candidate behaviors to form a new behavior schedule. Put another way, the candidate planner module 215 selects operational behaviors (i.e., behavior that will be actually be performed) from among the candidate behaviors based on priority and timing considerations. In various embodiments, the new behavior schedule indicates, for one or more frames, when each operational behavior will be performed by the virtual agent model/virtual agent.

At step 460, the candidate planner module 215 determines whether a schedule is currently running. For example, it is possible that based on a prior schedule, the virtual agent model is being animated to smile, laugh, speak or perform other gestures for one or more upcoming frames. If there is no schedule currently running, the method proceeds to step 470 and the new schedule is started.

If a previously created behavior schedule is currently running, then the method proceeds to step 465, where the candidate planner module 215 optionally adds transitional behaviors to the new behavior schedule. Transitional behaviors are any behaviors that allow for a more natural transition from a previous behavior schedule to a new behavior schedule. For instance, consider an example in which a prior behavior schedule is performed causing the virtual agent to simulate laughing. Then, an event occurs that requires a new behavior schedule, which indicates that the virtual agent should respond verbally to the event. It might seem strange if the virtual agent model immediately and abruptly shifted from a laughing state to a speaking state. Thus, the candidate planner module may include some transitional behaviors in to the new behavior schedule to ease the transition i.e., animations that indicate a gradual diminishing of the laughing animation, a look of surprise that interrupts the laughing animation before speaking begins, etc. Once the transitional behaviors are added to the new behavior schedule, the method proceeds to step 470.

At step 470, the candidate planner module 215 starts the new behavior schedule. In various embodiments, the candidate planner module 215 transmits the behavior schedule to the virtual agent device 104 so that it can be implemented at the virtual agent device. At step 475, the rendering module/virtual agent device generates one or more new frames based on the behavior schedule (e.g., as discussed in connection with step 330 of FIG. 3.) The new frames animate the virtual agent model such that the virtual agent model performs the behaviors identified in the behavior schedule. The new frames are then displayed at the virtual agent device 104.

A wide range of behaviors can be generated using the above method in response to various types of conditions and events. Consider the following example, which involves micro-expressions. Micro-expressions are types of behaviors or expressions performed by the virtual agent/model whose duration is very short. They can, for example, simulate signs of nervousness, apprehension (e.g., with faster blinking, slight twitches at the mouth or eyebrows, etc.) or other types of emotional reactions, either positive or negative.

Consider an example micro-expression rule with an associated trigger and selector (e.g., steps 420 and 425.) In this example, the virtual agent also includes an emotion component "arousal," which represents simulated stress or arousal levels of the virtual agent. It is represented by a parameter with values ranging from 0 to 1 (e.g., 0 being an absolute absence of stress/arousal, and 1 being a maximum amount of arousal/stress.) The trigger of the rule is satisfied if the arousal component changes more than 0.5 within a particular period of time (e.g., 3 frames, 10 seconds, etc.) It should be noted that in this embodiment, as previously discussed, the trigger may be satisfied more or less easily based on the personality of the virtual agent, since the degree of change in emotions such as arousal may also be based on the personality e.g., a virtual agent with a low neuroticism personality component may be "stressed" less (i.e., have its arousal component/parameter affected less by particular events) than a virtual agent with a higher neuroticism personality component.

The selector of the micro-expression rule indicates that if the above trigger is satisfied, a particular type of behavior (facial pose) should be considered for performance. That is, the candidate planner module will search only facial pose types of behaviors (e.g., as seen in FIG. 5.) Example facial pose behaviors include a surprise expression, a raising of the brow, a pursing of the lips, etc. Each behavior is associated with or includes one or more tags (e.g., as discussed in connection with step 420.) Each tag matches with a particular condition or conditions e.g., event, action, interaction context, agent state and/or emotion/mood/personality, etc. The selector further indicates that if the trigger is satisfied, the candidate planner module should select candidate behaviors that match the facial pose type and the current interaction context, agent state/PEM and/or current conditions (e.g., as discussed in step 435 of FIG. 4 and steps 315-325 of FIG. 3.)

The above features of the micro-expression rule enable a variety of flexible virtual agent responses to an array of different conditions. For example, consider a situation in which the virtual agent is criticized and interrupted by the user (interaction context), resulting in a sharp drop in happiness (emotion) and increase in arousal (emotion). (These actions and reactions may be determined in steps 315-325 of FIG. 3.) Thus, the trigger is satisfied (e.g., step 430) and the behavior planner module searches all facial posture behaviors for tags that match the above interaction context and emotions (e.g., step 435). A suitable matching behavior is found, which results in a narrowing of the eyelids, indicating anger or frustration. On the other hand, the micro-expression rule might also be triggered by the user dropping and shattering a glass (interaction context), which "surprises" or "startles" the virtual agent, resulting in a sharp increase in arousal (emotion). However, the virtual agent is otherwise generally happy, since previously the conversation between the user and virtual agent was civil and pleasant i.e., the happiness emotion component for the virtual agent is high. In this case, since the trigger is met, the behavior planner module searches for behaviors with tags that match the current interaction context and emotion. As a result, a behavior is selected that results in the virtual agent widening their eyes in surprise. However, a behavior indicating a negative attitude (e.g., a narrowing of the eyelids) is not selected or implemented, because it does not match the current emotion of the virtual agent.

The above example micro-expression rule also indicates how a wide variety of rules and parameters can be associated with the implementation of associated behaviors. In the above example, the micro-expression rule also requires that (1) the duration of any selected behavior, when implemented, is very short (e.g., 50-100 msec) in length, and (2) that the selected behavior may vary in strength, as represented by an associated parameter (e.g., a vector or scale from 0 to 1, where 0 indicates a very weaker version of the expression and 1 a very extreme version of the expression.) The strength/intensity parameter may be based on any suitable event, condition or characteristic (e.g., the interaction context, agent state, personality/emotion/mood, etc.)

Rules can exert a fine-tuned control over the implementation of a particular behavior. For example, each behavior (e.g., a smile) may be associated with a parameter (e.g., a scale of 0 to 1.0) that indicates the strength or extent of the behavior (e.g., a small, quick smile as opposed to a broad smile involving greater movement of the lips.) Although selectors for different rules may involve invoking the same behavior, the selector for one rule may trigger or require a low-strength behavior (e.g., the behavior with its associated parameter at a lower value) while the selector for another rule may trigger a high-strength behavior (e.g., the same behavior with its associated parameter at a higher level.)

Figure 7:
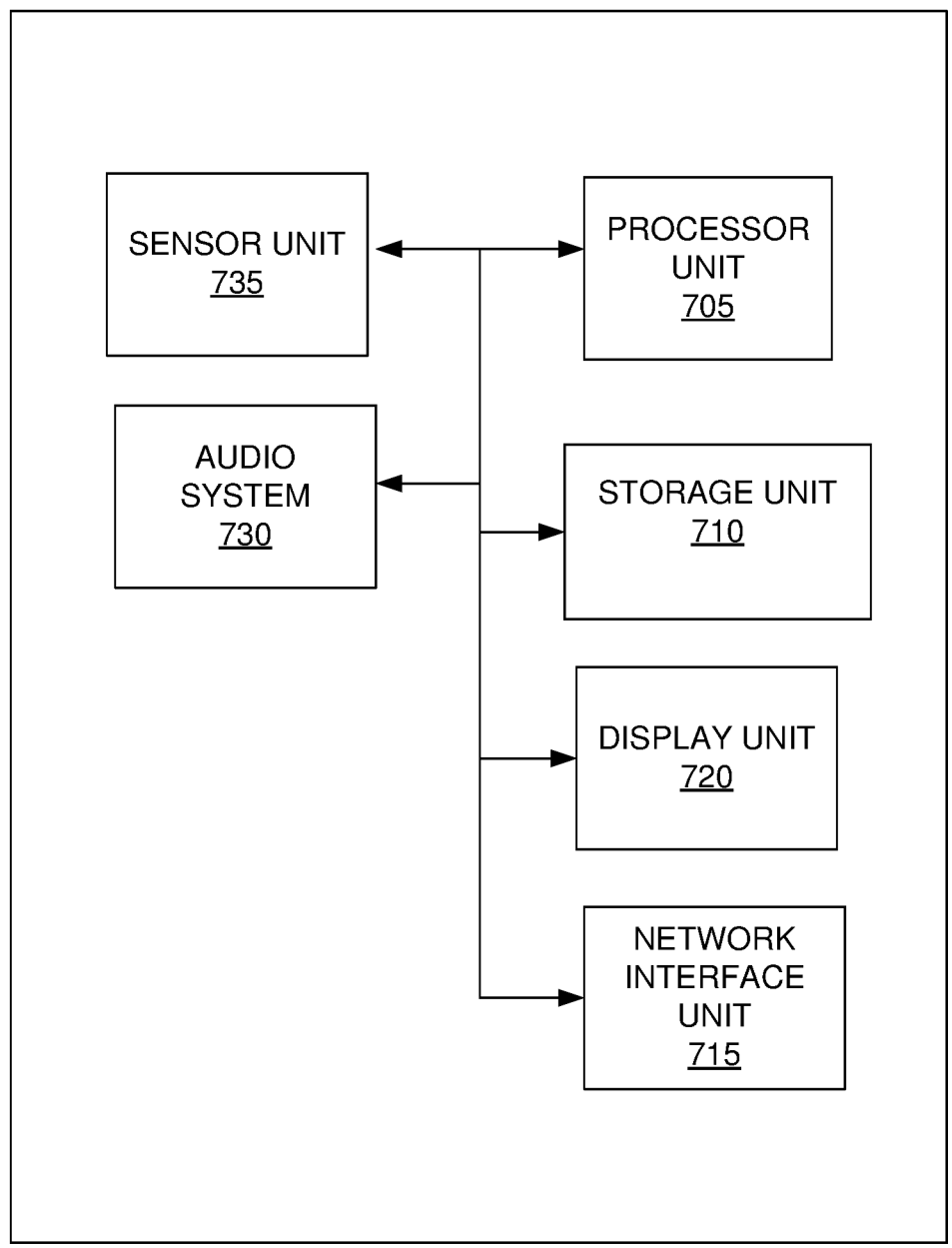
FIG. 7 is a block diagram of a virtual agent device according to a particular embodiment of the present invention.

Referring next to FIG. 7, a virtual agent device 700 according to a particular embodiment of the present invention will be described. The virtual agent device 700 may be, for example, the device 104 of FIGS. 1 and 2 or any suitable computing device. In some embodiments, the virtual agent device is a smartphone, virtual reality device, smart glasses, a smart watch, a computer, a laptop, a kitchen appliance, a refrigerator, a television, a game console, etc. The virtual agent device 700 includes a processor unit 705 having one or more processors, a sensor unit 735, a storage unit 710, a network interface unit 715, a display unit 720 and an audio system 730.

The storage unit 710 is any hardware or software suitable for storing data or executable computer code. The storage unit 710 can include but is not limited to a hard drive, flash drive, non-volatile memory, volatile memory or any other type of computer readable storage medium. Any operation, method and/or module/component for the virtual agent device 700 that is described in this application (e.g., as shown in FIG. 3) may be stored in the form of executable computer code or instructions in the storage unit 710. The execution of the computer code or instructions by the processor unit 705 causes the virtual agent device 700 or a suitable device coupled with the device 700 to perform any of the aforementioned operations or methods.

The network interface unit 715 includes any hardware or software suitable for enabling the virtual agent device 700 to communicate with external devices. In various embodiments, for example, the virtual agent device transmits sensor data to the server 110 using the network interface unit 715 (e.g., as discussed in connection with FIG. 2.) The virtual agent device 700 may also share sensor data with and/or obtain sensor data from other devices in the network. Additionally, the virtual agent device 700 may receive instructions, a behavior schedule or other data from the server 110 e.g., as discussed in connection with step 330 of FIG. 3.) The network interface unit 715 is arranged to transmit data and receive data using any suitable network (e.g., LAN, Internet, etc.) or communications protocol (e.g., Bluetooth, WiFi, NFC, IEEE 802.15.4, IEEE 802.11, etc.)

The sensor unit 735 includes any hardware or software suitable for sensing the environment around the device. The sensor unit may include but is not limited to a microphone, a camera or any suitable type of sensor (e.g., a motion sensor, light sensor, depth sensor, temperature sensor, a sensor for detecting an RF signal, etc.) The sensor unit is used to collect sensor data, which may be transmitted to the sensor analysis module 205 and/or the server 110 for further processing (e.g., as discussed in connection with steps 305 and 310 of FIG. 3.)

The display unit 720 is any hardware or software suitable for displaying the virtual agent model. In some embodiments, the display unit 720 includes but is not limited to a graphic processing unit, a video display screen, a 3D graphics engine, etc. The display unit is arranged to display a virtual agent model that represents the virtual agent (e.g., as described in connection with step 335 of FIG. 3.) The display unit 720 is also arranged to animate features of the virtual agent model based on the behavior schedule (e.g., as discussed in connection with steps 470 and 475 of FIG. 4.) The display unit 720 may include any display technology e.g., a touch sensitive (capacitive) screen, an e-ink display, an LCD or OLED display or any other suitable display technology.

In some embodiments, the virtual agent model takes on a tangible, physical form and is not limited to being displayed on a screen. By way of example, in various implementations, the virtual agent is represented by a robot. The robot may include a face, limbs, a body or any other body part that imitate those of a human being, animal or other creature/character/entity. Any behaviors described herein may be performed at the robot and may thus cause a visual change and/or require the movement of limbs, facial features or other elements of the robot e.g., a smile behavior can cause the lips on the face of the robot to mechanically and/or physically move to simulate a human smile.

The audio system 730 is any hardware or software suitable for generating any type of audio e.g., audio messages, voice recordings, spoken words or language, music, tones, sounds, etc. In various embodiments, the audio system includes a speaker, text to speech software, etc. The audio system 730 is arranged to help generate any audio that is part of a behavior that is implemented at the virtual agent (e.g., as discussed in connection with FIGS. 2 and 3.)

Figure 8:
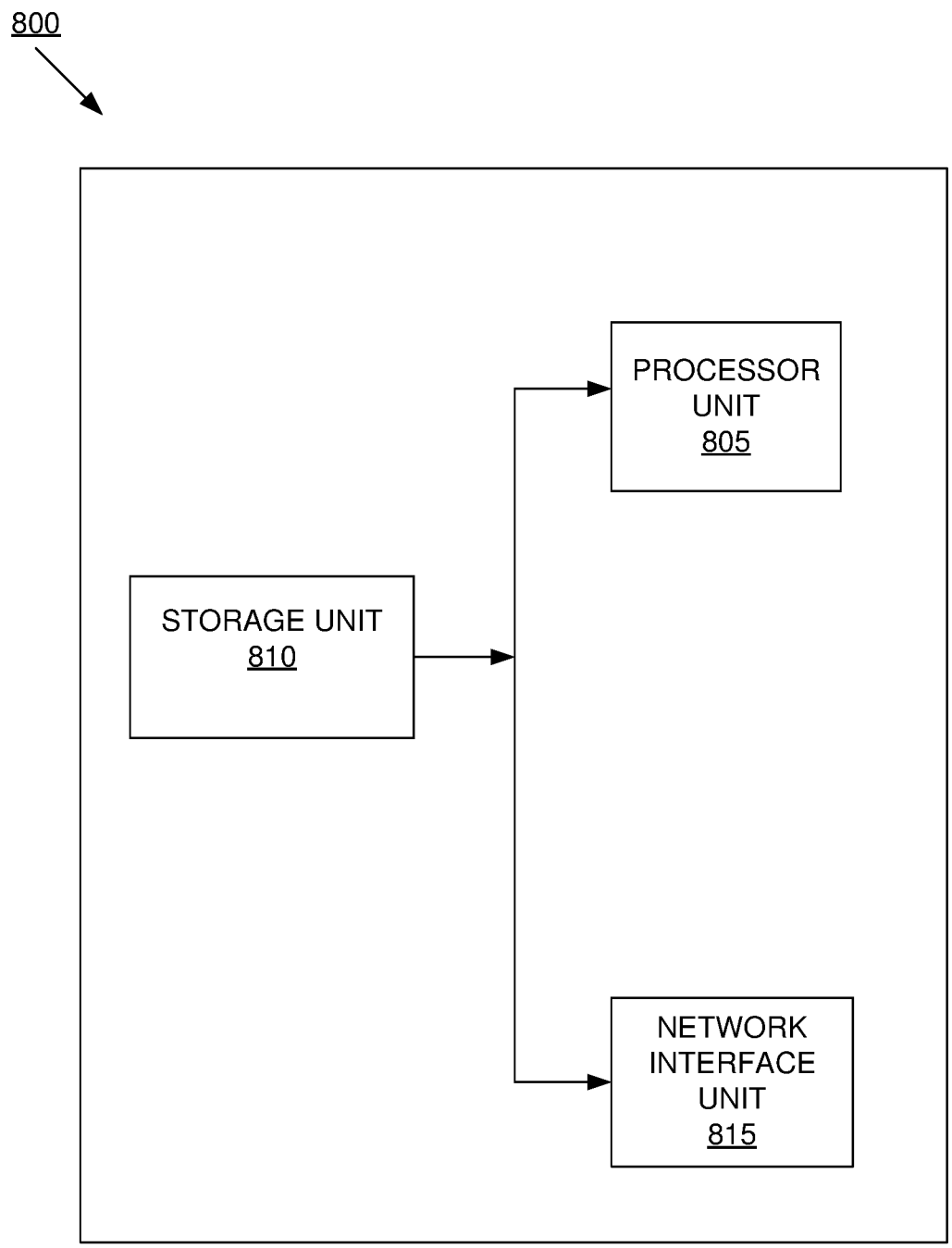
FIG. 8 is a block diagram of a virtual agent device according to a particular embodiment of the present invention.

Referring next to FIG. 8, a server 800 according to a particular embodiment of the present invention will be described. The server 800 may be, for example, the server 110 of FIGS. 1 and 2. The server in FIGS. 1, 2 and 8 may represent a single server or a network of two or more servers. The server 800 includes a processor unit 805 having one or more processors, a storage unit 810 and a network interface unit 815.

The storage unit 810 is any hardware or software suitable for storing data or executable computer code. The storage unit 810 can include but is not limited to a hard drive, flash drive, non-volatile memory, volatile memory or any other type of computer readable storage medium. Any operation, method and/or module/component for the server 800 that is described in this application (e.g., FIGS. 1-3) may be stored in the form of executable computer code or instructions in the storage unit 810. The execution of the computer code or instructions by the processor unit 805 causes the server 800 or a suitable device coupled with the server 800 to perform any of the aforementioned operations or methods.

The network interface unit 815 includes any hardware or software suitable for enabling the server 800 to communicate with external devices. In various embodiments, for example, the server 800 receives sensor data from the virtual agent device 104 using the network interface unit 815 (e.g., as discussed in connection with FIG. 2.) The server 800 also transmits a behavior schedule or other data to the virtual agent device 104 using the network interface unit 815 e.g., as discussed in connection with step 330 of FIG. 3. The network interface unit 815 is arranged to transmit data and receive data using any suitable network (e.g., LAN, Internet, etc.) or communications protocol (e.g., Bluetooth, WiFi, NFC, IEEE 802.15.4, IEEE 802.11, etc.)

In some of the above examples, we refer to a particular server or a virtual agent device. However, it should be appreciated that the operations of the server may be instead performing by more than one server or virtual agent devices. Also, operations/features for a server may be performed by a virtual agent device, and vice versa.

Although only a few embodiments of the invention have been described in detail, it should be appreciated that the invention may be implemented in many other forms without departing from the spirit or scope of the invention. For example, the present application and figures describe various methods that perform particular operations. It should be appreciated that in some embodiments, one or more of these operations/steps may be modified, reordered and/or deleted. Additionally, some figures, such as FIGS. 2, 7 and 8, describe devices/systems that contain various components/modules. It should be noted that in some embodiments, one or more of these components may be merged together. In still other embodiments, one or more components may be separated into a greater number of components. The features of one component may be transferred to another and/or modified as appropriate. Each device may have additional components beyond what is shown in the corresponding figure. Particular modules or devices that are shown as being part of a particular object may instead be coupled with the object e.g., with a wired or wireless connection. Therefore, the present embodiments should be considered illustrative and not restrictive and the invention is not to be limited to the details given herein.

What is claimed is:

1. A method of operating a virtual agent on a user device, comprising:
   obtaining an interaction context, the interaction context including at least one of a communication context, target information, situation information, or people information;
   identifying a personality of the virtual agent, wherein the personality is based on a role the virtual agent is performing and includes a parameter indicating a strength of the personality;
   determining an agent state, based on the interaction context, for the virtual agent to simulate while interacting with a user, wherein the simulation includes thinking when the interaction context is obtained;
   updating an emotion of the virtual agent based on the agent state and the personality of the virtual agent;
   selecting one or more behaviors from a plurality of behaviors based on the updated emotion of the virtual agent;
   modifying an appearance of the virtual agent or audio by the virtual agent, based on the selected one or more behaviors; and
   updating a mood of the virtual agent based on the agent state and the personality of the virtual agent, wherein the mood is updated after a first time threshold based on the interaction context, and the mood is updated after a second time threshold based on a moving average of the emotion.

2. The method of claim 1, further comprising determining the interaction context by sensing an environment around a device.

3. The method of claim 1, further comprising displaying a virtual agent model of the virtual agent; and
   wherein modifying the appearance of the virtual agent comprises modifying the displayed virtual agent model based on the selected one or more behaviors.

4. The method of claim 1, wherein:
   the personality of the virtual agent is not dependent on the interaction context, and
   the interaction context effects the emotion of the virtual agent based on the personality of the virtual agent.

5. The method of claim 1, wherein each behavior of the plurality of behaviors is associated with one or more tags, each tag is associated with at least one of the simulation, a current emotion of the virtual agent, a mood of the virtual agent, or the personality of the virtual agent.

6. The method of claim 1, wherein the personality of the virtual agent is predefined.

7. The method of claim 1, wherein the personality of the virtual agent is adjustable by the user based on the role the virtual agent is providing to the user.

8. The method of claim 1, wherein the emotion includes one or more emotion parameters and wherein the mood is based on the moving average of the emotion parameters over a predetermined period of time.

9. The method of claim 1, further comprising:
   obtaining a behavior corpus that includes a plurality of predefined behaviors;
   obtaining a rule set including a plurality of predefined rules, each rule is associated with a selector and a trigger, wherein:
      the trigger is a condition that matches the emotion or the agent state, and
      the selector is a search criteria that searches the behavior corpus; and when at least one of the updated emotion, or the agent state matches the trigger of the rule in the rule set, selecting the one or more behaviors, from the behavior corpus, based on the selector and trigger of one rule from the rule set.

10. The method of claim 9, further comprising:
    choosing one or more candidate behaviors based on the selector and the updated emotion;
    determining whether a first candidate behavior, of the one or more of the candidate behaviors, conflicts with a second candidate behaviors, of the one or more of the candidate behaviors; and
    in response to determining that the first candidate behavior is in conflict with the second candidate behavior, selecting for implementation, the first candidate behavior or the second candidate behavior, based on a priority indicator.

11. The method of claim 10, wherein candidate behaviors conflict when the conflicting candidate behaviors involve adjusting a same part of a body simulated by the virtual agent.

12. The method of claim 1, further comprising, rendering the virtual agent at a plurality of frames per second.

13. The method of claim 1, wherein the interaction context is obtained using a network of two or more sensor devices.

14. The method of claim 1, wherein the virtual agent is represented by a graphical model that is three-dimensional.

15. A non-transitory computer readable storage medium including executable computer code embodied in a tangible form wherein the non-transitory computer readable storage medium comprises executable computer code operable to:
    obtain an interaction context, the interaction context including at least one of a communication context, target information, situation information and people information;
    identify a personality of a virtual agent, wherein the personality is based on a role the virtual agent is performing and includes a parameter indicating a strength of the personality;
    determine an agent state, based on the interaction context, for the virtual agent to simulate while interacting with a user, wherein the simulation includes thinking when the interaction context is received;
    update an emotion of the virtual agent based on the agent state and the personality of the virtual agent;
    select one or more behaviors from a plurality of behaviors based on the updated emotion of the virtual agent;
    modify an appearance of the virtual agent or of audio by the virtual agent, based on the selected one or more behaviors; and
    updating a mood of the virtual agent based on the agent state and the personality of the virtual agent, wherein the mood is updated after a first time threshold based on the interaction context, and the mood is updated after a second time threshold based on a moving average of the emotion.

16. A device comprising:
    at least one processor,
    a speaker;
    a microphone configured to receive audio information; and
    memory circuitry including a computer readable storage medium that is arranged to store computer code in a tangible form wherein the computer code, when executed by the at least one processor, causes the device to:

obtain an interaction context, the interaction context including at least one of a communication context, target information, situation information and people information, identify a personality of a virtual agent, wherein the personality is based on a role the virtual agent is performing and includes a parameter indicating a strength of the personality, determine an agent state, based on the interaction context, for the virtual agent to simulate while interacting with a user, wherein the simulation includes thinking when the interaction context is received, update an emotion of the virtual agent based on the agent state and the personality of the virtual agent, select one or more behaviors from a plurality of behaviors based on the updated emotion, modify an appearance of the virtual agent or of audio by the virtual agent, based on the selected one or more behaviors; and updating a mood of the virtual agent based on the agent state and the personality of the virtual agent, wherein the mood is updated after a first time threshold based on the interaction context, and the mood is updated after a second time threshold based on a moving average of the emotion.

17. The device of claim 16, further comprising:
one or more sensors, wherein the interaction context is based at least in part on sensor data received from the one or more sensors.

18. The device of claim 16, wherein the interaction context is based at least in part on the audio information received using the microphone.

19. The device of claim 16, is at least one of a refrigerator, a laptop computer, a computer, a tablet, a phone, a watch, glasses, or a virtual reality device.

* * * * *